United States Patent Office 2,811,566
Patented Oct. 29, 1957

2,811,566

HALOGENATED PHENOLS

Alfred R. Bader, Milwaukee, Wis., assignor to Pittsburgh Plate Glass Company, Allegheny County, Pa., a corporation of Pennsylvania No Drawing. Application October 21, 1954,
Serial No. 463,813

8 Claims. (Cl. 260—623)

This invention relates to the preparation of halogenated phenolic compounds, and pertains more particularly to the preparation of halogenated derivatives of alkenylphenols. These derivatives have not been prepared heretofore.

In copending applications, Serial Nos. 337,226, 337,227, and 337,228, all filed February 16, 1953, and 430,439, filed May 12, 1954 (applications Ser. Nos. 337,228 and 430,439 now abandoned) methods for the preparation of alkenylphenols are disclosed. These methods involve generally the reaction of acyclic conjugated dienes such as butadiene-1,3 and isoprene, with phenolic compounds such as phenol, and the alkenylphenols obtained are very useful for many purposes. For example, they condense readily with aldehydes such as formaldehyde in the presence of either acidic or alkaline catalysts to give resinous condensation products which are in turn compatible with many other resinous materials including vinyl resins, epoxy resins, polyvinylbutyral resins, alkyd resins and the like. Blends of alkenylphenol-aldehyde resins with the resinous materials listed are useful as sanitary linings for food containers and similar uses. The alkenylphenols also react readily to form alkenylphenoxycarboxylic acids useful as herbicides, and are useful for many other purposes.

It has now been discovered that the alkenylphenols will react with a halogen, and particularly with chlorine or bromine, to form a variety of novel halogenated phenolic compounds. For example, as the halogen is added to the alkenylphenol, addition occurs first at the double bond of the side chain or chains after which ring substitution takes place. Upon dehydrohalogenation in the presence of zinc or similar dehydrohalogenating agent, the side chain halogens are removed, leaving a compound having an unsaturated side chain or chains and a halogenated nucleus. This series of reactions is illustrated by the following equations, wherein p-2-butenylphenol and chlorine are used for illustrative purposes.

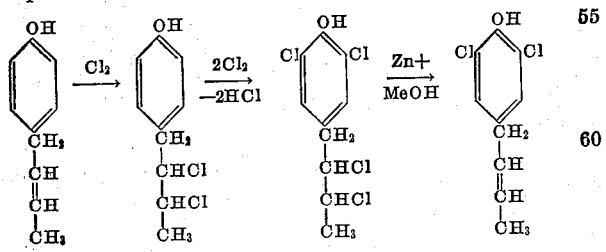

As indicated hereinabove, alkenylphenols are readily obtained by the reaction of acyclic conjugated dienes with phenolic compounds in the presence of certain catalysts such as the Friedel-Crafts compounds. This reaction results in the production of a mixture of alkenylphenols, including monobutenylphenols, dibutenylphenols and tributenylphenols, together with minor portions of ethers and higher phenols. For example, the reaction product obtained by the reaction butadiene-1,3 with phenol in the presence of an aqueous sulfuric acid catalyst is generally composed of less than about 15 percent unreacted phenol, less than about 5 percent of ethers, 55 percent to 70 percent of monobutenylphenols and 15 percent to 50 percent of the higher boiling phenols, including di- and tributenylphenols and polyphenols. Ordinarily, the unreacted phenol and ethers will be removed from the reaction mixture by distillation before halogenation is carried out; however, this is not a critical expedient and the halogenation reaction takes place even though the unreacted phenols and ethers are not removed. Mixtures containing smaller quantities of monoalkenylphenols and larger quantities of the higher boiling phenols, for example, about 50 percent monoalkenylphenols and 30 percent to 50 percent of higher boiling phenols and the balance polyphenols and ethers, may also be employed with good results, as may mixtures containing no monoalkenylphenols. Also, the mixture may be composed entirely of ortho- and para-monoalkenylphenols.

It is to be understood that alkenylphenols can also be obtained by other methods known to the art in addition to the reaction of conjugated dienes with phenolic compounds, and it is intended that the present invention include the use of alkenylphenols regardless of the method whereby they are obtained.

As illustrative of the alkenylphenols which can be halogenated in accordance with the present invention there are set forth below the products of the reaction of butadiene-1,3 and phenol:

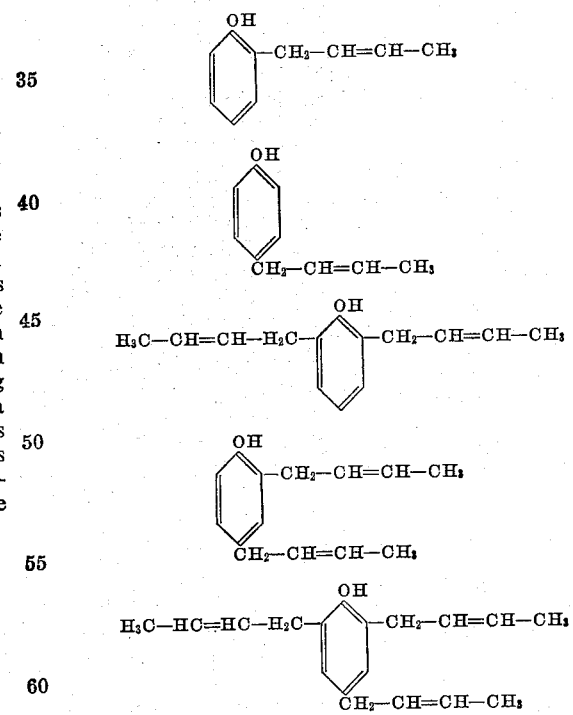

It will be noted that the unsaturated side chains of the compounds depicted structurally above all contain the double bond in the $\Delta^2$ position. However, the reaction of butadiene-1,3 with phenol also yields smaller quantities of butenylphenols having the double bond in the $\Delta^3$ position.

The alkenylphenols which are halogenated in accordance with this invention possess the general structure $R_n\text{-Ar-}(OH)_{n_1}$, wherein R is alkenyl or haloalkenyl, or alkoxyalkenyl, Ar is an aromatic radical, and $n$ and $n_1$ represent a whole number from 1 to 3, and which may be the same or different. The preferred alkenylphenols of this structure are those in which R is butenyl and Ar is phenyl, including o- and p-2-butenylphenols, di-2-butenyl phenols and tri-2-butenylphenols. However, other alkenylphenolic compounds may also be used, including butenylcresols, butenylcatechols, butenyl - 2,5 - dinitrophenols, butenyl-2,3-dimethoxyphenols, mono-, di and tributenylresorcinol, mono-, di- and tributenylguaiacols, pentenylphenols, pentenylcresols, pentenylguaiacols, hexenylphenols, hexenylcresols, di- and trihexenylcresols, and the like. Mixtures of two or more of the above materials may also be halogenated, it not being necessary to separate a mixture into the individual alkenylphenols in order to carry out the halogenation reaction. Obviously, those alkenylphenols possessing two or three alkenyl groups will take up sufficient halogen to saturate each of said side chains before ring substitution will occur. Thus, for example, tributenylphenol can be halogenated to form a compound possessing the following structure, wherein each X represents a halogen atom.

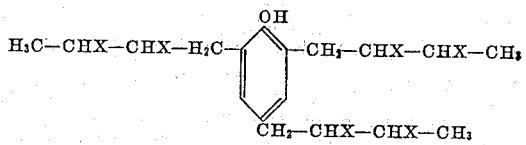

The halogenation of an alkenylphenol is readily carried out by passing the halogen, preferably as a gas or liquid, into a cooled solution of an alkenylphenol. The alkenylphenols, and particularly the butenylphenols, are soluble in alcohols such as methanol, butanol, ethanol, or the like, and the halogenation can be carried out in an alcoholic solution. However, other inert solvents and diluents, including ethers, toluene, xylene, or aliphatic hydrocarbons such as hexane or the like may also be employed, as may chlorinated hydrocarbons such as chloroform and carbon tetrachloride. Alternatively, the halogenation can be carried out in the absence of any solvent or diluent, that is, simply by passing the gaseous or liquid halogen into a cooled or stirred liquid alkenylphenol. The reaction is exothermic and in some instances external cooling may be necessary. As stated hereinabove, the halogen atoms add to the double bond of the unsaturated side chain or chains, and then as the halogenation is continued, the halogen atoms add to the phenolic nucleus. This is confirmed by the fact that after sufficient halogen is added to saturate the side chain or chains of the alkenylphenolic compound, copious evolution of hydrogen halide begins, indicating that the nuclear hydrogen atoms are uniting with halogen. Thus, a polyhalo compound in which two halogen atoms are present in each side chain of the alkenylphenolic compound can be recovered if the halogenation process is stopped when evolution of a hydrogen halide gas begins. On the other hand, a polyhalo compound having two halogen atoms in each alkenylphenolic side chain, and two halogen atoms attached to the phenolic nucleus can be obtained simply by continuing the halogenation reaction until no more hydrogen halide is given off.

The side chain halogen atoms are easily removed by dehydrohalogenation in the presence of metallic zinc dust, alkalis, and other dehydrohalogenation agents. The dehydrohalogenation reaction is initially quite vigorous, but subsides rapidly, after which the reaction mixture should be refluxed for about an hour. The mixture is then cooled, filtered and the zinc and salts washed with an alcohol such as methanol. On distillation of the remainder of the reaction mixture, the desired dihalo compound is obtained, ordinarily as a colorless viscous oil. The product is believed to be largely a mixture of the two isomers which can in turn be separated by distillation.

The following examples illustrate the halogenation of alkenylphenols to obtain the various halogenated derivatives discussed hereinabove. The examples are not intended to limit the invention, however, for there are, of course, numerous possible variations and modifications.

*Example I*

Through a stirred solution of 200 grams of mixed monobutenylphenols (B. P. 60° C.–100° C./0.2 mm.; $n_D^{25}$ 1.5397) in 1000 cc. of methanol cooled to 0° C., chlorine gas was passed at such a rate that the reaction temperature did not rise above 10° C. The reaction mixture became slightly red in color, and after approximately 90 grams of chlorine had been taken up, copious evolution of hydrogen chloride began. After the weight of the reaction mixture had increased by 210 grams (chlorine taken up plus dissolved hydrogen chloride), the red, clear solution was treated with 200 grams of zinc dust in small portions. After the initially vigorous reaction had subsided, the mixture was refluxed for an hour, cooled, filtered, the zinc and zinc salts washed with methanol, and the combined filtrates distilled to yield 280 grams of a colorless, viscous oil, B. P. 110° C.–170° C./1 mm.; $n_D^{25}$ 1.556. The product distills in vacuum without decomposition and is a mixture of 4,6-dichloro-2-(2-butenyl)-phenol, and 2,6-dichloro - 4-(2-butenyl)-phenol; chlorine calculated for $C_{10}H_{10}Cl_2O$, 32.66 percent; found 31.4 percent. The two isomeric dichloro compounds can be separated by a simple fractionation at reduced pressure.

*Example II*

To a cooled solution of 84 grams of p-2-butenylphenol in 200 cc. carbon tetrachloride was added gaseous chlorine. The reaction was exothermic and the mixture was kept at 20° C.–35° C. At first there was no evolution of HCl, but evolution commenced after some chlorine had been taken up. After no more chlorine was being taken up, the faintly orange solution was stripped in vacuum to leave 163 grams of an almost colorless, viscous oil, $n_D^{25}$ 1.575, chlorine calculated for $C_{10}H_{10}OCl_4$, 49.25; found 48.93. The compound had the following structure.

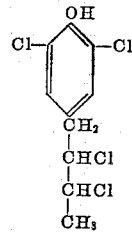

*Example III*

Chlorine gas was passed through a solution of 600 grams of mixed ortho- and para-monobutenylphenols in 2000 cc. of heptane. The reaction was exothermic, and the reaction temperature was kept below 55° C. by water cooling. After 290 grams of chlorine were taken up, the product was completely heptane insoluble and there was no evolution of hydrogen chloride. The heptane insoluble product was separated and found to consist mainly of the two pairs of diastereoisomeric dichlorobutylphenols.

When the reaction was repeated with the separation step being omitted and additional chlorine added, the product became heptane soluble and there was copious evolution of hydrogen chloride. After completion of chlorine uptake (562 grams) the light orange solution was stripped to yield 1177 grams of mixed dichlorobutyldichlorophenols; $n_D^{25}$ 1.5783.

*Example IV*

The addition of bromine to mixed ortho- and parabutenylphenols according to the method of the preceding examples proceeds similarly to yield first the mixed dibromobutylphenols and then, with evolution of hydrogen bromide, the mixed tetrabromophenols which can be dehalogenated with zinc to yield 2,6-dibromo-4-butenyl-phenol and 2,4-dibromo-6-butenylphenol.

Similarly, when iodine is substituted for chlorine or bromine in the above examples, or when other alkenylphenols such as pentenylphenols (prepared from isoprene and phenol) are utilized, the halogenation proceeds satisfactorily to yield halogenated alkenylphenols, the specific products obtained depending upon the degree to which the halogenation is carried.

The novel compounds of this invention are very useful materials. All of them, for example, react readily with aldehydes, and particularly formaldehyde, to give resinous condensation products which possess generally the useful properties of phenol-aldehyde resins, with the presence of the halogen atoms contributing fire retardant properties to the resins.

Moreover, the halogenated phenolic compounds can be utilized to prepare phenoxyacetic acids possessing insecticidal, herbicidal and fungicidal properties. Also, the alkenyldihalophenolic compounds, for example, 4,6-dichloro-2-(2-butenyl)phenol, undergo polymerization in the presence of catalysts such as strong acids to give hard, clear polymeric materials useful in coating compositions and the like.

It is apparent from the foregoing description that the halogenated alkenylphenols of this invention constitute a new and useful class of chemical compounds. It will also be apparent that numerous variations and modifications can be made in the procedures described herein without departing from the spirit and scope of the invention as defined in the appended claims.

I claim:

1. The method which comprises reacting a halogen with an alkenylphenol, continuing the reaction until evolution of hydrogen halide begins, and recovering from the reaction mixture a dihaloalkyl phenol formed by addition of halogen atoms to each side chain double bond of said alkenylphenol.

2. The method of claim 1 wherein the alkenylphenol is a butenylphenol.

3. The method of claim 1 wherein the halogen is chlorine.

4. The method which comprises reacting a halogen with an alkenylphenol, continuing the reaction until evolution of hydrogen halide begins and substantially ceases, and recovering from the reaction mixture a polyhalo compound in which two halogen atoms are added to each side chain double bond of the alkenylphenol, and two additional halogen atoms are attached to each phenolic nucleus.

5. The method of claim 4 wherein the alkenylphenol is butenylphenol and the halogen is chlorine.

6. The method which comprises reacting a halogen with an alkenylphenol, continuing the reaction until evolution of hydrogen halide begins and substantially ceases, adding a dehydrohalogenation agent to the reaction mixture, refluxing the reaction mixture, and recovering therefrom a nuclear halogenated alkenylphenol.

7. The method of claim 6 wherein the alkenylphenol is a butenylphenol and the halogen is chlorine.

8. The method of claim 7 wherein the dehydrohalogenation agent is zinc dust.

References Cited in the file of this patent

UNITED STATES PATENTS 2,122,581    Niederl ------------------ July 5, 1938

OTHER REFERENCES

Niederl et al.: Jour. Amer. Chem. Soc., vol. 53, pg. 3394 (1931).

Tarbell et al.: Jour. Amer. Chem. Soc., vol. 64, pgs. 607–12, 1066–70 (1942).